United States Patent Office 3,562,320
Patented Feb. 9, 1971

3,562,320
PROCESS FOR PRODUCING METHACRYLIC ACID
George E. Woodward, Freeport, Tex., and Richard W. Hein, Ridgefield, Conn.; said Hein assignor to Escambia Chemical Corporation, Pace, Fla., a corporation of Delaware
No Drawing. Filed Apr. 25, 1967, Ser. No. 633,413
Int. Cl. C07c *57/04*
U.S. Cl. 260—531                 12 Claims

ABSTRACT OF THE DISCLOSURE

Methacrylic acid is produced by dehydrating alpha-hydroxyisobutyric acid in the liquid phase under the influence of heat and a catalyst which is a metal salt of alpha-hydroxyisobutyric acid. The process is desirably carried out at a temperature in excess of about 180° C., while maintaining the alpha-hydroxyisobutyric acid in the liquid state. The metal salt of alpha-hydroxyisobutyric acid is obtained by reacting the acid with a metal hydroxide or metal salt which will react with the alpha-hydroxyisobutyric acid to produce the corresponding metal salt of the acid. Desirably, the process is carried out in the presence of a polymerization inhibitor for the methacrylic acid which is formed during the process.

---

The present invention relates to a novel process for producing methacrylic acid. More specifically, the invention is concerned with a novel method for dehydrating alpha-hydroxyisobutyric acid to produce methacrylic acid, under the influence of heat and a catalyst, to provide high yield of methacrylic acid at lower cost and without the difficulties which have hampered prior art methods.

As disclosed in the prior art, such as British Pat. No. 852,664, alpha-hydroxyisobutyric acid can be dehydrated using vapor-phase procedures to produce methacrylic acid. While this process offered certain advantages over prior art processes, this vapor phase catalytic dehydration was hampered by certain disadvantages. The process tended to produce coke which fouls the catalyst and reactors, requiring frequent shutdowns to clean out the reactors, and presented serious difficulties in purifying the product. This coking tends to make the catalyst usable for only short periods of use. Additionally, the type of catalyst employed required frequent regeneration to produce economical yields.

It is, accordingly, an object of the present invention to overcome the disadvantages of the prior art methods for producing methacrylic acid.

It is also an object of the present invention to provide a novel process for producing methacrylic acid in yields of 85% and greater by dehydration of alpha-hydroxyisobutyric acid.

It is a further object of the present invention to provide a novel and unique process for dehydrating alpha-hydroxyisobutyric acid in liquid phase to produce methacrylic acid in high yields without the problems coincident to formation of coke, tars or polymerization in the reactors as encountered in the vapor-phase prior art processes.

Other objects of the invention will be apparent to those skilled in the art from reading the present disclosure.

It is well known that methacrylic acid and its esters are of great commercial importance due to their usefulness in a wide variety of applications. Since they possess the ability to polymerize quite readily, one of the principal uses thereof is in the preparation of their polymers and copolymers with various other polymerizable compounds. The polymers prepared from the lower alkyl esters of methacrylic acid, particularly the methyl ester, find use in many applications because of their ease of being molded or cast into shapes, their clarity, light weight and strength.

Methacrylic acid can be prepared by (a) the oxidation of methacrolein, (b) the hydrolysis of acetone cyanohydrin, (c) the dehydration of alpha hydroxyisobutyric acid and (d) the oxidation of methyl alpha methyl vinyl ketone. The esters of methacrylic acid can be prepared by (a) the esterification of the free acid, and (b) by the dehydration of esters of alpha hydroxyisobutyric acid. Although much work has been done in an attempt to develop a commercial process utilizing dehydration techniques, these processes have presented numerous difficulties. This is evidenced by the fact that in spite of the abundance of work, patents and literature on the dehydration of alpha hydroxyisobutyric acid and its esters, most commercial processes utilize the hydrolysis of acetone cyanohydrin. Some of the reasons why the dehydration methods proposed have not found favor are that they (a) frequently result in low conversions to and yields of the desired products, (b) are frequently amenable only to batch type processes, (c) require large quantities of expensive catalysts and/or solvents, (d) result in contaminated products which are unsuitable for certain applications, and (e) existing processes produce severe corrosion problems due to the presence of halogen salts employed in the processes. The process of the present inventoon has substantially eliminated the above disadvantages and provides an excellent and economical dehydration process suitable for commercial-scale operations.

In accordance with the present invention, it has now been discovered that methacrylic acid may readily be obtained in high yields by heating alpha-hydroxyisobutyric acid in liquid phase in the presence of a metal salt of the latter which acts as a dehydration catalyst. The catalyst employed permits the process to be carried out by maintaining the alpha-hydroxyisobutyric acid in the liquid phase during the process.

The compounds which may be employed in providing the dehydration catalysts are those metal salts or metal hydroxides which form a metal salt with alpha-hydroxyisobutyric acid. Among the salts and hydroxides which may be employed are preferably those of the alkali-metals and alkaline-earth metals, such as, sodium hydroxide, lithium, hydroxide, potassium hydroxide, calcium hydroxide barium hydroxide, magnesium hydroxide, sodium sulfite, calcium carbonate, sodium carbonate, potassium carbonate, strontium carbonate, magnesium carbonate, sodium bicarbonate, potassium acetate, sodium acetate, sodium dihydrogen phosphate, etc. The metal salt of alpha-hydroxyisobutyric acid may be formed in situ by bringing the alpha-hydroxyisobutyric acid and the metal salt or base together in the reactor or it may be produced in similar fashion prior to introduction into the reactor.

In accordance with a preferred embodiment of the invention the alpha-hydroxyisobutyric acid, in liquid phase, is brought into contact with the metal salt of alpha-hydroxyisobutyric acid, which performs the role of dehydration catalyst, at an elevated temperature. The elevated temperature employed really has only two limitations. If the temperature is too low, the reaction rate is reduced to a point where the production of methacrylic acid is so slow as to become uneconomical. If the temperature is too high, too much of the alpha-hydroxyisobutyric acid will boil away from the reaction mixture before it can react to form methacrylic acid. Too low a temperature tends to concentrate the methacrylic acid in the reaction mixture where it may polymerize or condense and it thus reduces the efficiency of the process. The optimum temperature varies with the pressure and is approximately the boiling point of alpha-hydroxyisobutyric acid at any given pressure. The rate of reaction increases with temperature and therefore with increases in pressure. Substantially elevated or reduced pressures tend to require more costly apparatus which can provide and withstand high, superatmospheric or low, subatmospheric pressures. However, elevated and reduced pressures may be employed. It is preferred to operate at atmospheric pressure or slightly above or below.

Optimally, the process is conducted at a temperature range of about 160–250° C. with the preferred temperature range being between about 210° and 225° C. It should be understood, however, that higher and lower temperatures may be employed. Preferably the process is conducted at a temperature of at least about the boiling point of alpha-hydroxyisobutyric acid at the pressure employed. This produces optimum yields.

In the process, the alpha-hydroxyisobutyric acid, along with its metal salt, or a base or salt of a metal which will react with alpha-hydroxyisobutyric acid to produce the metal salt of the alpha-hydroxyisobutyric acid, are brought together at sufficiently elevated temperature to melt the alpha-hydroxyisobutyric acid and produce a fluid reaction mixture. Water, or a solvent for the alpha-hydroxyisobutyric acid, such as acetone or acetic acid, in an amount sufficient to convert the reaction mixture to the fluid state, may be employed. Amounts of water up to about 50% by weight of the reaction mixture may be employed in a continuous process. The introduction of large amounts of water is undesirable since it requires the eventual removal from the reaction product. The fact that the reaction mixture is fluid permits excellent contact between the catalyst and the starting material. This minimizes overheating and formation of polymers or decomposition products which tend to reduce the yield of desired methacrylic acid. As a result of the heating in the presence of the dehydration catalyst, water is catalytically removed from the alpha-hydroxyisobutyric acid to produce methacrylic acid. The methacrylic acid and water formed are distilled from the reactor and upon condensation produce a product rich in methacrylic acid which can be further isolated by fractional distillation. The process of the invention can be either batch-wise or continuous as shown in the examples which follow.

The concentration of the metal salt of alpha-hydroxyisobutyric acid can be varied at will. The rate of formation of methacrylic acid is directly proportional to the concentration of the metal salt of alpha-hydroxyisobutyric acid in the reaction mixture. Any concentration may be used from a fraction of 1% of the reaction mixture up to about 70% of the reaction mixture. The optimum range for a continuous process is between about 20% and 40%. Amounts in the order of 1% to 5% have been found to be highly effective for batch operations.

In order to inhibit polymerization of the methacrylic acid formed during the reaction, it is desirable to employ a polymerization inhibitor during the process. It has been found that inhibitors such as phenothiazine, hydroquinone or its methyl ether, air or oxygen, are effective for this purpose.

In order more clearly to disclose the nature of the present invention, specific examples of the practice of the invention are hereinafter given. It should be understood, however, that this is done by way of example and is intended neither to delineate the scope of the invention nor limit the ambit of the appended claims. Parts are expressed in terms of parts by weight, unless otherwise stated.

EXAMPLE 1

A mixture of 300 grams of alpha-hydroxyisobutyric acid (96% purity), 15 ml. of water, 5 grams of sodium formate and 1 gram each of phenothiazine and methyl ether of hydroquinone were mixed in a distillation flask, heated rapidly to boiling and subjected to distillation through a distillation column at atmospheric pressure to make and recover the product. The product which boiled between 94° and 157° C. was collected and was found to contain methacrylic acid in a yield of 89% based on the amount of alpha-hydroxyisobutyric acid employed. The phenothiazine and methyl ether of hydroquinone were employed as polymerization inhibitors. In this example the sodium formate reacts with alpha-hydroxyisobutyric acid to form the sodium salt of that acid, which is the dehydration catalyst. No problems resulting from formation of coke, tar or polymerization products were encountered.

EXAMPLE 2

Alpha-hydroxyisobutyric acid was converted to methacrylic acid in a continuous process carried out over a period of 16 hours employing an apparatus equipped with automatic controls and means for regulating the rate of introduction of alpha-hydroxyisobutyric acid and the other reaction components. The reaction mixture was subsequently subjected to distillation at atmospheric pressure. In the process, alpha-hydroxyisobutyric acid containing 1.3% of its weight of the sodium salt of alpha-hydroxyisobutyric acid was pumped continuously into the apparatus maintained at a temperature of about 230° C. The process was carried out for about 16 hours at a feed rate of alpha-hydroxyisobutyric acid of about 5.2 grams per minute. A polymerization inhibitor comprising a 5% solution of hydroquinone in water was fed into the system just prior to and during distillation at the rate of 0.18 gram per minute. The distillate boiling at a temperature of between about 140° C. and 143° C. at atmospheric pressure was collected at a rate of 5.1 grams per minute. The distillation product was found to contain an average yield of about 92.1% of methacrylic acid, based on the amount of alpha-hydroxyisobutyric acid and its sodium salt employed. Air was introduced into the system to make the hydroquinone effective for preventing polymerization of the methacrylic acid in the apparatus. If it is desired to carry out the continuous process of this example for periods substantially in excess of 16 hours, it is desirable to purge the contents of the reactor periodically so as to remove excessive amounts of alkali and unwanted by-products, including tar materials.

EXAMPLE 3

In a batch operation, about 104 grams (1 mole) of alpha-hydroxyisobutyric acid, 2.0 grams of sodium hydroxide, 0.2 gram of methyl ether of hydroquinone were mixed in a distillation flask and heated for 7 hours at a temperature of 200–202° C. while introducing air into the reaction vessel at a rate of 42 ml. per minute. The reaction products distilling at 93–133° C. were collected and found to contain methacrylic acid in a yield of about 95%. The methacrylic acid was removed from the water in the distillate by fractional distillation. The sodium hydroxide reacted with the alpha-hydroxyisobutyric acid to produce its sodium salt which acts as the dehydration catalyst.

EXAMPLE 4

Example 3 was repeated except that an equal amount of potassium hydroxide was employed in place of the sodium hydroxide. The rate of distillation of methacrylic acid and water was found to be the same as that of Example 3.

In each of the foregoing examples the sodium salt of alpha-hydroxyisobutyric acid, or the hydroxide or salt which reacts with alpha-hydroxyisobutyric acid to produce sodium or potassium alpha-hydroxyisobutyrate, may be replaced by a hydroxide of any strong metal or any alkali-forming metal salt of an acid which will react with alpha-hydroxyisobutyric acid to produce a salt of the metal and the alpha-hydroxyisobutyric acid. Among the preferred metals are the alkali-metals and the alkaline-earth metals. These include such metals as sodium, lithium, potassium, calcium, barium, strontium, magnesium, etc. Among the salts and hydroxides which may be employed for this purpose are: sodium hydroxide, lithium hydroxide, potassium hydroxide, calcium hydroxide, barium hydroxide, magnesium hydroxide, sodium sulfite, calcium carbonate, sodium carbonate, potassium carbonate, strontium carbonate, magnesium carbonate, sodium bicarbonate, potassium acetate, sodium acetate, sodium dihydrogen phosphate, etc. The preferred dehydration catalysts are those which provide an alkali metal salt of alpha-hydroxyisobutyric acid, preferably the sodium or potassium salts.

Bases or salts which react with alpha-hydroxyisobutyric acid to produce quantitatively the metal salts of the acid are preferred, since they provide a more effective catalyst. For this reason sodium or potassium hydroxide are most desirable, along with sodium or potassium acetate, formate or carbonate. Those which do not produce the salts of alpha-hydroxyisobutyric acid quantitatively are satisfactory, but less desired, since the catalyst produced provides dehydration at a slower rate. In this category are sodium tetraborate, sodium oxalate, calcium and magnesium salts.

The terms and expression which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for producing methacrylic acid which comprises treating alpha-hydroxyisobutyric acid in the liquid phase at a temperature of at least about 160° C. in the presence of a dehydration catalyst comprising an alkaline or alkaline-earth metal salt of alpha-hydroxyisobutyric acid.

2. A process according to claim 1 wherein the process is carried out at substantially atmospheric pressure.

3. A process according to claim 1 wherein the dehydration catalyst is an alkali-metal salt of alpha-hydroxyisobutyric acid.

4. A process according to claim 1 wherein the dehydration catalyst is an alkaline-earth metal salt of alpha-hydroxyisobutyric acid.

5. A process according to claim 1 wherein the dehydration catalyst is the sodium salt of alpha hydroxyisobutyric acid.

6. A process according to claim 1 wherein the dehydration catalyst is the potassium salt of alpha-hydroxyisobutyric acid.

7. A process according to claim 1 wherein the metal salt of alpha-hydroxyisobutyric acid is produced in situ by treating the alpha-hydroxyisobutyric acid with a member selected from the class consisting of a metal hydroxide and a metal salt.

8. A process according to claim 1 wherein the reaction temperature is between about 160° and 250° C.

9. A process according to claim 1 wherein the reaction temperature is between about 210° and 225° C.

10. A process according to claim 1 wherein the process is carried out at a temperature of at least about the boiling point of alpha-hydroxyisobutyric acid at the pressure employed.

11. A process according to claim 1 wherein the process is carried out in the presence of a polymerization inhibitor.

12. A process according to claim 11 wherein the polymerization inhibitor is a member selected from the class selected of phenothiazine, hydroquinone and its methyl ether, air and oxygen.

References Cited

UNITED STATES PATENTS 2,393,737  1/1946  Bortnick _____ 260—593X
3,487,101  12/1969  Völker et al.

FOREIGN PATENTS 677,746  11/1966  Belgium.

LORRAINE A. WEINBERGER, Primary Examiner

D. E. STENZEL, Assistant Examiner